United States Patent
Hu et al.

(10) Patent No.: US 10,848,265 B2
(45) Date of Patent: Nov. 24, 2020

(54) RANGE EXTENSION OF WIRELESS COMMUNICATION DEVICE

(71) Applicant: Avago Technologies International Sales Pte. Limited, Singapore (SG)

(72) Inventors: Chunyu Hu, Sunnyvale, CA (US); Matthew J. Fischer, Mountain View, CA (US); Zhou Lan, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/960,397

(22) Filed: Apr. 23, 2018

(65) Prior Publication Data
US 2019/0327019 A1    Oct. 24, 2019

(51) Int. Cl.
*H04L 1/00* (2006.01)
*H04W 74/08* (2009.01)
*H04W 72/12* (2009.01)

(52) U.S. Cl.
CPC ....... *H04L 1/0006* (2013.01); *H04W 72/1273* (2013.01); *H04W 74/0808* (2013.01)

(58) Field of Classification Search
USPC ........................................................ 370/329
See application file for complete search history.

(56) References Cited

U.S. PATENT DOCUMENTS

| 2016/0150505 A1* | 5/2016 | Hedayat | H04W 72/04 |
| | | | 370/329 |
| 2016/0277944 A1* | 9/2016 | Bhushan | H04W 24/02 |
| 2019/0007130 A1* | 1/2019 | Fang | H04B 7/2656 |

* cited by examiner

*Primary Examiner* — Natasha W Cosme
(74) *Attorney, Agent, or Firm* — Foley & Lardner LLP (57) ABSTRACT

In some aspects, the disclosure is directed to methods and systems for extending a range of wireless communication. In one aspect, a first station device from one or more stations receives a trigger frame comprising a predetermined bit from an access point. The first station device may transmit to the access point a first response message in a first format during a first time period, in response to detecting the predetermined bit in the trigger frame. The first station device may transmit to the access point, a second response message in a second format during a second time period, in response to detecting the predetermined bit in the trigger frame. The first station device may receive, from the access point, a downlink frame during a third time period after the first time period and the second time period.

20 Claims, 9 Drawing Sheets

RANGE EXTENSION OF WIRELESS COMMUNICATION DEVICE

FIELD OF THE DISCLOSURE

This disclosure generally relates to systems and methods for wireless communication. In particular, this disclosure relates to systems and methods for range extension of wireless communication devices.

BACKGROUND OF THE DISCLOSURE

Wireless network allows devices to exchange messages through a wireless medium (e.g., air or vacuum). In one aspect, an access point (AP) is communicatively coupled to station devices through a wireless medium, and enables the stations devices to connect to an external network (e.g., Internet or other network).

In one aspect, an AP and station devices communicate in an asymmetric manner. For example, the AP may include a transmitter that outputs a wireless signal having a higher power (e.g., 10 dB higher) than wireless signals output by station devices. For another example, the AP may include a receiver having a higher sensitivity than receivers of the station devices. Accordingly, station devices configured as mobile devices may output a wireless signal having a lower power than the AP, allowing the station devices to be implemented with more cost and power efficient circuitries.

Depending on a distance between a station device and the AP, the station device and the AP may not communicate successfully. In one example, the station device may successfully detect a wireless signal from the AP and extract messages from the detected wireless signal, because the output power of the wireless signal is sufficient to overcome the path loss between the station device and the AP for the station device. However, the AP may not detect a wireless signal from the station device or extract messages from the detected wireless signal, because the output power of the wireless signal transmitted by the station device is insufficient to overcome the path loss.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for range extension; and     Section B describes a network environment and computing environment which may be useful for practicing embodiments described herein.

A. Range Extension

Various embodiments disclosed herein are related to a method, a system, and a non-transitory computer readable medium storing instructions for extending a range of wireless communication devices.

In one aspect, the range of the wireless communication device is improved by configuring one or more station devices to transmit at least two response messages to an AP through wireless signals. Each of the at least two response messages indicates that the AP can transmit or is clear to transmit a downlink frame during a dedicated time period. A message or frame herein refers to data (e.g., baseband data) for transmission through a wireless signal (e.g., RF signal). A downlink frame is data for transmission from an AP to a station device, and an uplink frame is data for transmission from a station device to an AP. An AP or a station device may generate a wireless signal by encoding and modulating data or frame onto a carrier signal and may transmit the wireless signal. An AP or a station device may receive message or data by receiving a wireless signal, demodulating the received wireless signal, and extracting the message or data from the demodulated wireless signal.

The station device may transmit the at least two response messages, in response to a predetermined bit transmitted by the AP. The at least two response messages from the station device may be transmitted through different wireless signals in different formats, power levels, bandwidths, frequencies, or any combination of them.

Advantageously, by configuring the station device to transmit at least two response messages in different wireless signals, the range of the wireless communication between the AP and the station device can be improved. In one aspect, the AP is more likely to receive one of two or more response messages transmitted by a station device, compared to a single response message transmitted by the station device. In one example, the station device may be located at a distance away from the AP that renders a wireless signal transmitted by the station to be received by the AP with sensitivity or a signal to noise ratio below a detectable level. By configuring the station device to transmit wireless signals in two different formats, power levels, bandwidths, frequencies, or any combination of them, the AP may detect one of the wireless signals and extract a response message from the detected wireless signal.

For example, a first response message may be transmitted in a first wireless signal with a first bandwidth and a second response message may be transmitted in a second wireless signal with a second bandwidth wider than the first bandwidth. Effectively, the power of the first wireless signal received by the AP is higher than the power of the second wireless signal received by the AP, due to the narrower bandwidth of the first wireless signal than the second wireless signal. Therefore, the AP can receive the first response message in the first wireless signal even though the AP may not receive the second response message in the second wireless signal.

In one aspect, the first response message and the second response message cause a wireless signal including the downlink frame to be transmitted with less interference. In particular, the first response message and the second response message transmitted by a station device prevent nearby station devices from transmitting any wireless signal during a time period for transmission of the downlink frame. Accordingly, the downlink frame can be transmitted without interference from other station devices.

In one aspect, the wireless signals including response messages have different formats to reduce interference from station devices operating in different formats. In some implementations, station devices operate based on different standards, where a station device operating according to one standard may not extract a response message from a wireless signal in another standard. For example, a first station device compatible with a first standard (e.g., IEEE 802.11ax) and a second standard (e.g., 802.11a) may receive a first response message in a wireless signal conforming to the first standard and receive a second response message in a second wireless signal conforming to the second standard, where a second station device compatible with the second standard but not the first standard may receive the second response message in the second wireless signal, but not the first response message in the first wireless signal. In response to the second response message, the second station device may stop transmission of any wireless signal during the time period for the transmission of the downlink frame. Hence, the downlink frame may be transmitted with less interference.

Figure 1:
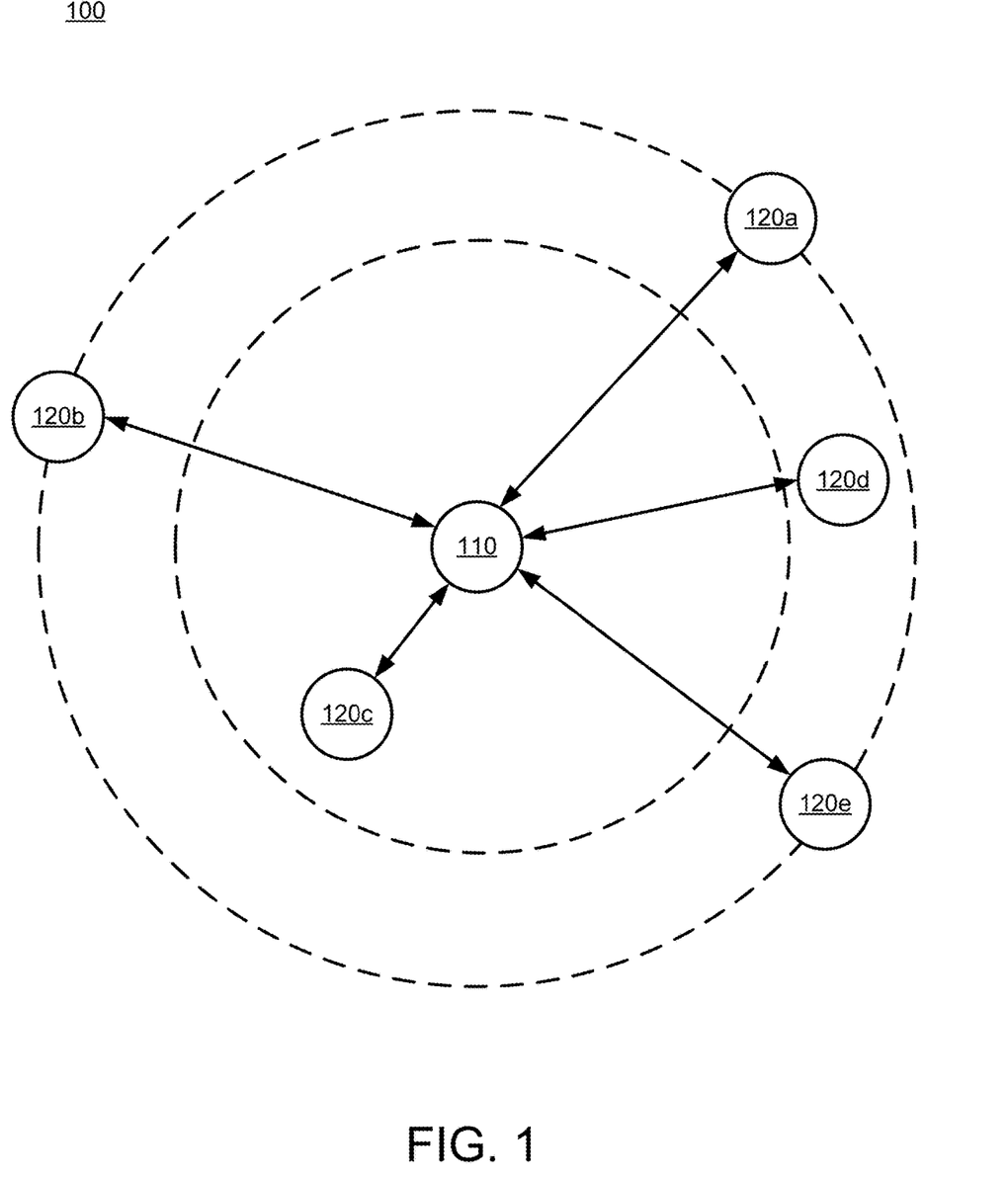
FIG. 1 is a diagram depicting an example wireless communication environment.

Referring to FIG. 1, illustrated is a diagram depicting an example wireless communication environment 100. In the wireless communication environment 100, the AP 110 communicates with station devices 120a, 120b . . . 120e. The AP 110 is a device that communicates with the station devices 120 through a wireless medium, and enables the station device 120 to communicatively connect to an external network (e.g., Internet). The station devices 120 may be computing devices (e.g., desktops, laptops, smart phones, tablet computers, etc.). Detailed implementation and examples of the AP 110 and the station device 120 are provided below with respect to FIGS. 7A through 7C.

In one aspect, the AP 110 and the station devices 120 communicate with each other in an asymmetric manner. For example, the AP 110 transmits a wireless signal with a higher output power (e.g., 10 dB higher) than station devices 120. For another example, the AP 110 may have a higher sensitivity than the station devices 120. Hence, the station devices 120 may be configured as mobile devices with more cost and power efficient circuitries than the AP 110.

In one configuration, asymmetry between the AP 110 and the station devices 120 may hinder communication from the station device 120 to the AP 110 according to a distance between the station device 120 and the AP 110. For example in FIG. 1, the station device 120c is closer to the AP 110 than the station device 120a. In this example, the station devices 120a and 120c may receive messages from the AP 110, because the output power of the wireless signal transmitted by the AP 110 is sufficient to overcome the path loss between the station device 120a and the AP 110 and the station device 120c is closer to the AP 110 than the station device 120a. In response to the messages from the AP 110, the station devices 120a and 120c may transmit response messages to the AP 110. The AP 110 may receive the response message from the station device 120c but not the response message from the station device 120a, because the station device 120a is located further away from the AP 110 than the station device 120c. Specifically, the output power of the wireless signal transmitted by the station device 120c may be sufficient to overcome the path loss, but the output power of the wireless signal transmitted by the station device 120a may be insufficient to overcome the path loss.

In one embodiment, the AP 110 transmits a trigger frame to establish a downlink communication. The trigger frame includes a predetermined bit that causes the station device 120 to transmit two or more response messages. In one aspect, the response messages indicate that the AP 110 may transmit the downlink frame during an allocated time period. In another aspect, the response messages indicate that other station devices 120 should not transmit any wireless signal during the allocated time period for the transmission of the downlink frame.

In one approach, the station device 120 transmits response messages in different wireless signals with different formats, power levels, bandwidths, frequencies, or any combination of them. For example, a first response message may be transmitted in a first wireless signal with a first bandwidth and a second response message may be transmitted in a second wireless signal with a second bandwidth wider than the first bandwidth. Effectively, the power of the first wireless signal received by the AP 110 is higher (e.g., 10 dB) than the power of the second wireless signal received by the AP 110. Therefore, the AP 110 can better detect the first wireless signal and extract the first response message from the detected wireless signal compared to the second wireless signal.

In one aspect, the response messages transmitted in different formats allow a reduction in interference during a time period for transmission of the downlink frame. In one example, a station device 120a operates according to a first standard (e.g., IEEE 802.11 ax) and a station device 120b operates according to a second standard (e.g., IEEE 802.11a). The station device 120a may receive a trigger frame from the AP 110 and transmit a first response message in a first wireless signal conforming to the first standard and a second response message in a second wireless signal conforming to the second standard. In response to at least one of first response message and the second response message, the AP 110 may transmit a downlink frame during an allocated time period. Meanwhile, the station device 120b may respond to the second response message from the station device 120a. In particular, the station device 120b may not transmit any wireless signal during the time period for the transmission of the downlink frame. Accordingly, the AP 110 may transmit the downlink frame to the station device 120a without interference from the station device 120b.

Figure 2:
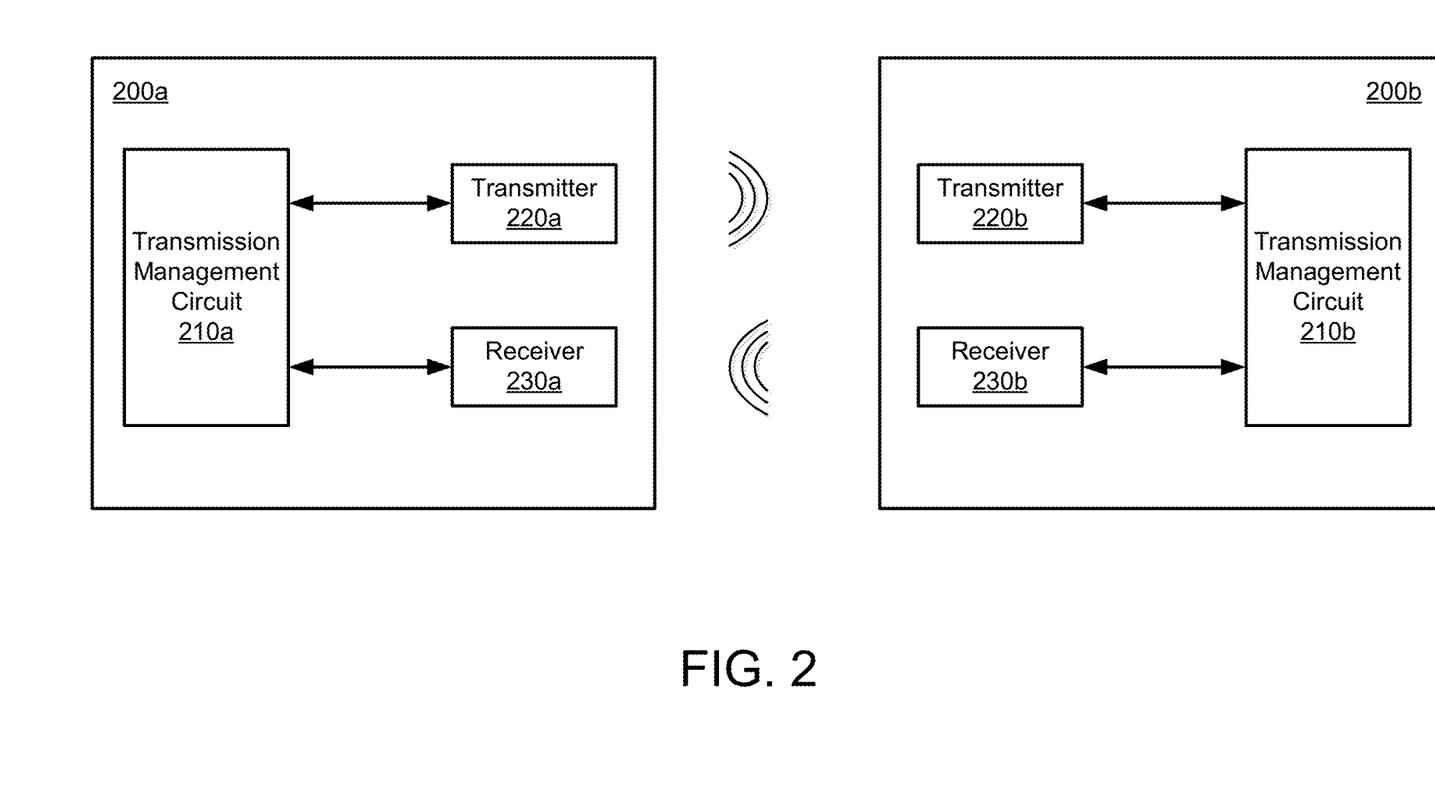
FIG. 2 is a diagram depicting example communication devices, according to one implementation.

Referring to FIG. 2, illustrated is a diagram depicting example communication devices 200a, 200b, according to one implementation. The communication device 200a may be the AP 110 and the communication device 200b may be the station device 120 of FIG. 1. Each communication device 200 includes a respective transmission management circuit 210, a transmitter 220, and a receiver 230. These components operate together to exchange data (e.g., messages or frames) through a wireless medium. These components may be embodied as application specific integrated circuit (ASIC), field programmable gate array (FPGA), or any combination of them. In some embodiments, the transmission management circuit 210 is embodied as a processor and a non-transitory computer readable medium storing instructions when executed by the processor cause the processor to execute various functions described herein. In some embodiments, the communication device 200 includes more, fewer, or different components than shown in FIG. 2.

The transmitter 220 is a circuit that receives data (e.g., messages or frames) from a transmission management circuit 210, and transmits a wireless signal according to the received data. In one configuration, the transmitter 220 is coupled between the transmission management circuit 210 and an antenna (not shown). The transmitter 220 may modulate the received data in baseband from the transmission management circuit 210 onto a carrier signal to generate a wireless signal at an RF frequency (e.g., 10 MHz to 10 GHz, or over 60 GHz), and transmit the wireless signal through the antenna.

The receiver 230 is a circuit that receives a wireless signal from another device and extracts baseband data (e.g., messages or frames) from the received wireless signal. The receiver 230 is coupled between the transmission management circuit 210 and an antenna (not shown). The receiver 230 and the transmitter 220 may be coupled to the same antenna or separate antennas. The receiver 230 may receive a wireless signal though an antenna, and demodulate the wireless signal at an RF frequency based on a carrier signal to extract a baseband signal from the wireless signal. The receiver 230 then provides the baseband signal to the transmission management circuit 210.

The transmission management circuit 210 configures the transmitter 220 and the receiver 230 to exchange data (baseband) with a transmission management circuit of another device through a wireless medium. For example, the transmission management circuit 210 may enable or disable the transmitter 220 or the receiver 230 at a corresponding time period. For another example, the transmission management circuit 210 may adjust gain, power level, signal to noise ratio, bandwidth, frequency, sensitivity, or any combination of them for the transmitter 220 and the receiver 230. In one aspect, the transmission management circuit 210 may configure the transmitter 220 and the receiver 230 according to a type of message (e.g., a trigger frame, a first response message or a second response message) being transmitted or received.

In one configuration, the transmission management circuit 210a generates a trigger frame (in baseband or intermediate frequency) including a predetermined bit. The predetermined bit may cause one or more station devices 120 receiving the predetermined bit to transmit a first response message and a second response message. In one approach, the predetermined bit is included in a common information section directed to a plurality of station devices to cause station devices identified in per user information sections to transmit the first response message and the second response message. A per user information section is a section within a trigger frame that identifies a corresponding station device. A per user information section may include an identification of a corresponding station device. In another approach, the predetermined bit is included in a per user information section directed to a particular station device to cause the particular station device to transmit the first response message and the second response message. Examples of the trigger frames are provided below with respect to FIGS. 6 and 7. The transmission management circuit 210a provides a trigger frame to the transmitter 220a for transmission to one or more station devices 120.

The transmission management circuit 210a enables the receiver 230a to receive the first response message and the second response message after transmission of the trigger frame. In one implementation, the transmission management circuit 210a enables the receiver 230a for a first time period to receive a first response message and for a second time period to receive a second response message through the receiver 230a. Depending on an anticipated format, bandwidth, frequency, power level, or a combination of them, the transmission management circuit 210a may configure the receiver 230a accordingly. While the receiver 230a is enabled, the transmission management circuit 210a may receive the first response message or the second response message during a corresponding time period.

The transmission management circuit 210a generates a downlink frame, in response to receiving at least one of the first response message and the second response message. The transmission management circuit 210a provides the downlink frame to the transmitter 220a for transmission to a station device 120. The transmission management circuit 210a may encode the downlink frame and provide the encoded downlink frame to the transmitter 220a for transmission. By encoding the downlink frame, an authorized station device may decode a wireless signal to extract the downlink frame, but an unauthorized station device may not decode the wireless and may be prevented from extracting the downlink frame.

In one configuration, the transmission management circuit 210b receives a trigger frame through the receiver 230b. The receiver 230b may receive a wireless signal from the communication device 200a, and demodulate the wireless signal to obtain the trigger frame. The transmission management circuit 210b may determine whether the trigger frame includes a predetermined bit requesting response messages. In response to detecting the predetermined bit, the transmission management circuit 210b determines whether the predetermined bit is directed to the communication device 200b or not. For example, if the predetermined bit is included in the common user information section or in the per user information section associated with the communication device 200b, the transmission management circuit 210b generates response messages. If the predetermined bit is not directed to the communication device 200b, the transmission management circuit 210b may not respond to the predetermined bit.

In response to the predetermined bit directed to the communication device 200b, the transmission management circuit 210b generates response messages. The response messages may include a first response message and a second response message. The transmission management circuit 210b may provide the first response message and the second response message to the transmitter 220b for transmission. In one approach, the first response message is transmitted during a first time period, and the second response message is transmitted during a second time period. The first response message and the second response message may be transmitted through different wireless signals having different formats, power levels, bandwidths, frequencies, or any combination of them. In one example, the first response message conforms to a first standard (e.g., IEEE 802.11ax) where the second response message conforms to a second standard (e.g., IEEE 802.11a). The first response message may indicate an identity of the communication device 200b generating the first response message, where the second response message may not indicate an identity of the communication device 200b. Additionally or alternatively, the first response message is transmitted in a wireless signal having a narrower bandwidth than a wireless signal including the second response message. Effectively, power of the wireless signal including the first response message becomes higher than the power of the wireless signal including the second response message.

The transmission management circuit 210b receives a downlink frame through the receiver 230b. The receiver 230b may receive a wireless signal from the communication device 200a, demodulate the wireless signal, and decode the demodulated signal to obtain the downlink frame.

In one aspect, the transmission management circuit 210b disables the transmitter 220b, in response to a first response message or a second response message during a time period for transmission of the downlink frame. Specifically, in response to detecting a first response message, a second response message, or both from another communication device (e.g., another station device 120), the transmission management circuit 210b disables its transmitter 220b to prevent transmission of any wireless signal during the time period for transmission of the downlink frame. Accordingly, the wireless signal including the downlink frame may be transmitted by the AP 110 with less interference.

Figure 3:
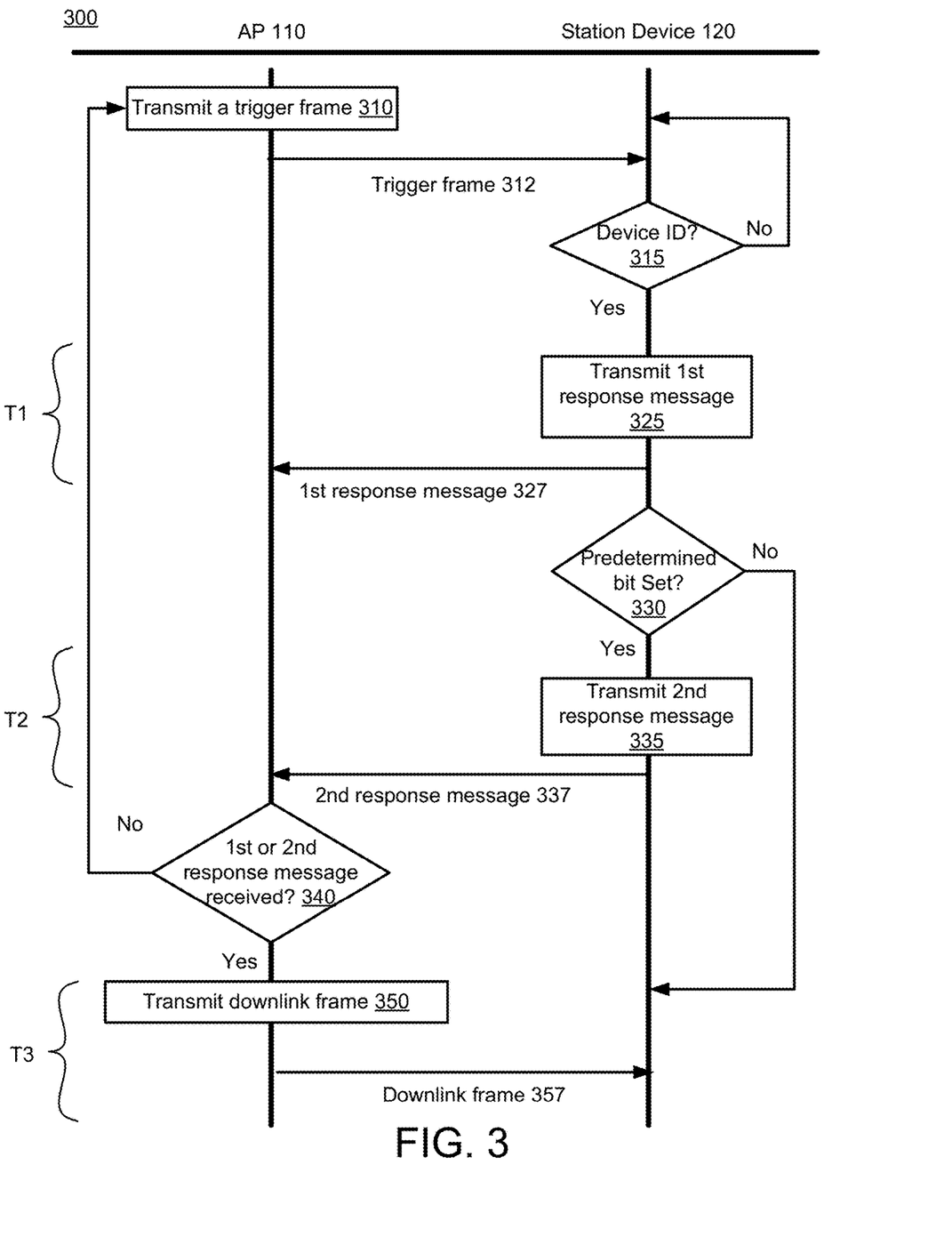
FIG. 3 is an interaction diagram depicting a process of establishing a downlink communication, according to one implementation.

Referring to FIG. 3, illustrated is an interaction diagram depicting a process 300 of establishing a downlink communication, according to one implementation. The process 300 may be performed by the AP 110 and the station device 120 of FIG. 1. The process 300 may include more, fewer, or different steps than shown in FIG. 3.

The AP 110 transmits 310 a trigger frame 312. The AP 110 may transmit the trigger frame 312 in response to a request for the downlink communication. The AP 110 may transmit the trigger frame 312 in a wireless signal by modulating the trigger frame 312 onto a carrier signal at an RF frequency and by transmitting the wireless signal. The trigger frame 312 may include a predetermined bit that causes a particular station device receiving the trigger frame 312 to transmit response messages.

The station device 120 receives the trigger frame 312 in the wireless signal, and determines 315 whether the trigger frame 312 includes an identification of the station device 120. For example, the station device 120 determines 315 whether an identification of the station device 120 is included in any of per user information sections in the trigger frame 312. If the trigger frame 312 does not include the identification of the station device 120, the station device 120 may wait to receive another trigger frame without transmitting any response messages to the trigger frame 312.

If the identification of the station device 120 is included in the trigger frame 312 (e.g., in a per user information section), then the station device 120 transmits a first response message 327. The station device 120 may modulate the first response message 327 onto a carrier signal to generate a first wireless signal, and transmit 325 the first wireless signal to the AP 110.

If the identification of the station device 120 is included in the trigger frame 312 (e.g., in a per user information section), the station device 120 determines 330 whether a predetermined bit is set or not. The predetermined bit may be in a common information section of the trigger frame or in the per user information section including the identification of the station device 120. In response to detecting the predetermined bit (e.g., '1'), the station device 120 transmits a second response message 337. The station device 120 may modulate the second response message 337 onto a carrier signal to generate a second wireless signal, and transmit 335 the second wireless signal to the AP 110. The station device 120 may employ the same carrier signal for the first response message and the second response message. Alternatively, the station device 120 may employ different carrier signals for the first response message and the second response message. The first wireless signal may have different formats, power levels, bandwidths, frequencies, or any combination of them, than the second wireless signal. For example, the first wireless signal including the first response message 327 may have a narrower bandwidth than the second wireless signal including the second response message 337.

If the predetermined bit is not detected but the identification of the station device 120 is included in the trigger frame 312, then the station device 120 may bypass transmitting the second response message 337, such that only the first response message 327 is transmitted without the second response message 337.

In one aspect, the station device 120 transmits the first response message 327 during a first time period T1 and transmits the second response message 337 during a second time period T2 after the first time period T1. The station device 120 may automatically determine a predetermined time after receiving the trigger frame 312 to be the first time period T1 and the second time period T2 and transmit the first response message 327 and the second response message 337 during the determined time periods. Alternatively, the first time period T1 and the second time period T2 may be specified by the trigger frame 310, and the station device 120 may transmit the first response message 327 and the second response message 337 during corresponding time periods specified by the trigger frame 310.

After transmission of the trigger frame 312, the AP 110 enables its receiver (e.g., receiver 230a) during the first time period T1 to receive the first response message 327 and during the second time period T2 to receive the second response message 337. The AP 110 may change configurations of the receiver 230a during the first time period T1 and the second time period T2. For example, the AP 110 may configure the bandwidth configurations, frequencies, sensitivity, etc. of the receiver 230a differently during the first time period T1 and the second time period T2.

After the first time period and the second time period T2, the AP 110 determines 340 whether at least one of the first response message 327 and the second response message 337 is received or not. If no response message is received, the AP 110 may transmit another trigger frame 312 and repeat the process.

If at least one of the first response message 327 and the second response message 337 is received, the AP 110 may transmit 350 a downlink frame 357 during a third time period T3. The AP 110 may modulate the downlink frame 357 onto a carrier to generate a wireless signal, and transmit the wireless signal to the station device 120. In one embodiment, the AP 110 transmits 350 a downlink frame 357 to a particular station device 120, if both of the first response message 327 and the second response message 337 of the particular station device 120 are received. In some embodiments, there may be multiple station devices 120 employed as shown in FIG. 1. The AP 110 may receive a first response message 327, a second response message 337 or both from a particular station device 120, and transmit 350 the downlink frame 357 to the particular station device or to multiple station devices.

The station device 120 may enable its receiver during the time period T3 to receive the downlink frame 357. The station device 120 may enable its receiver during the time period T3 to receive the downlink frame 357, after transmitting both the first response message 327 and the second response message 337, for example, because the predetermined bit is set in the trigger frame 312 and the identification of the station device 120 is included in the trigger frame 312. The station device 120 may also enable its receiver during the time period T3 to receive the downlink frame 357, after transmitting only the first response message 327 but not the second response message 337, for example, because the predetermined bit is not set in the trigger frame 312 but the identification of the station device 120 is included in the trigger frame 312.

Figure 4:
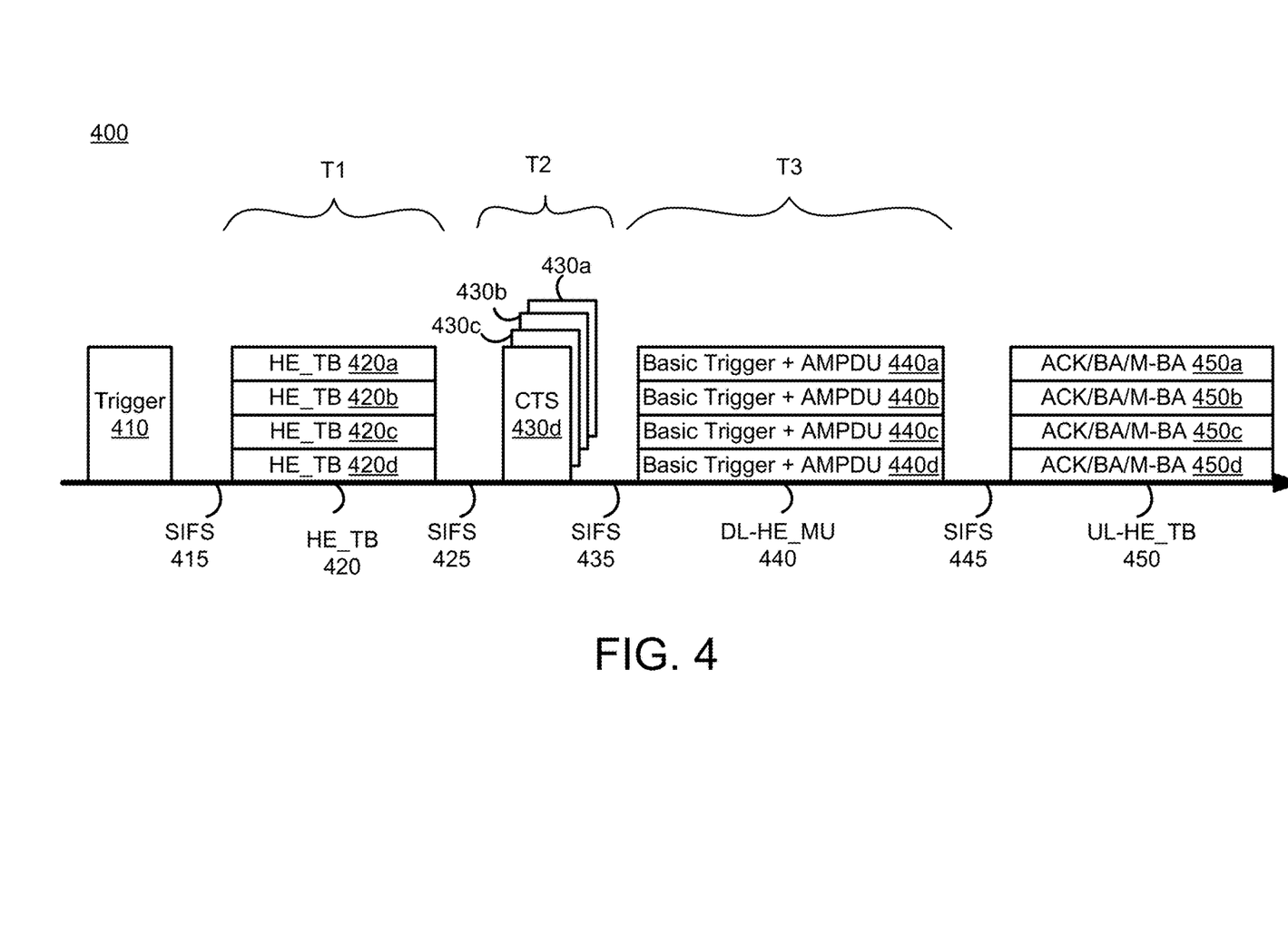
FIG. 4 is a timing diagram depicting a process of establishing a downlink communication, according to one implementation.

Referring to FIG. 4, illustrated is a timing diagram 400 depicting a process of establishing downlink communication, according to one implementation. The downlink communication may be established between the AP 110 and the station devices 120 of FIG. 1.

The AP 110 transmits a trigger frame 410 to one or more station devices 120. In response to the trigger frame 410, and after short interframe space (SIFS) 415, the station devices 120 transmit corresponding response messages HE_TB 420 as first response messages during a first time period T1. Each HE_TB 420 may identify a station device 120 transmitting the HE_TB 420. After transmissions of the HE_TB 420 during the first time period T1 and another SIFS 425, the station devices 120 transmit corresponding response messages clear to send (CTS) 430 as second response messages during a second time period T2. The CTS 430 may not identify which station device is transmitting the CTS 430. Moreover, the CTS 430 may be transmitted in a wireless signal having a broader bandwidth than a wireless signal including the HE_TB 420. After receiving the HE_TB 420 during the first time period T1, the CTS 430 during the second time period T2, or both, the AP 110 transmits downlink frames DL-HE_MU 440 to one or more authorized station devices during a third time period T3, which is SIFS 435 after the second time period T2. After receiving the DL-HE_MU during the third time period T3 and another SIFS 445, the station devices may transmit acknowledge messages UL-HE_TB 450 confirming receipt of the downlink frames DL-HE_MU.

Figure 5:
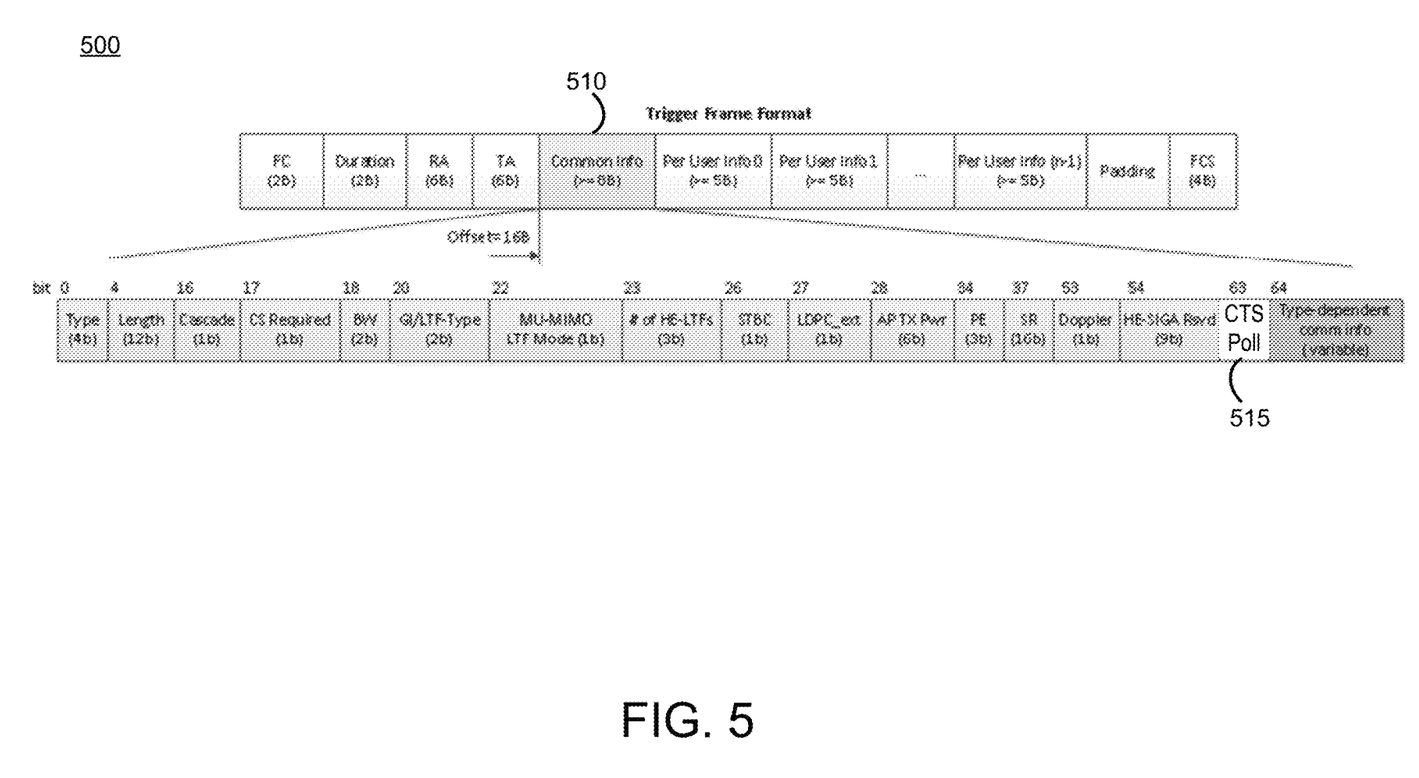
FIG. 5 is a diagram depicting an example trigger frame with a clear-to-send (CTS) poll in a common information section.

Referring to FIG. 5, illustrated is a diagram depicting an example trigger frame 500 with a clear-to-send (CTS) poll 515 in a common information section 510. In one implementation, the trigger frame 500 is divided into a plurality of sections including a common information section 510 and multiple per user information sections. The common information section 510 is directed to any station device 120 receiving the trigger frame 500, where the per user information section is directed to one or more corresponding station devices. In one approach, the common information section 510 includes a CTS poll 515. The CTS poll 515 is a predetermined bit that causes a station device 120 identified in a per user information section to transmit a first response message (e.g., HE_TB 420) and a second response message (e.g., CTS 430). Hence, multiple station devices may transmit multiple first response messages during a first time period, and transmit multiple second response messages during a second time period, in response to the CTS poll 515.

Figure 6:
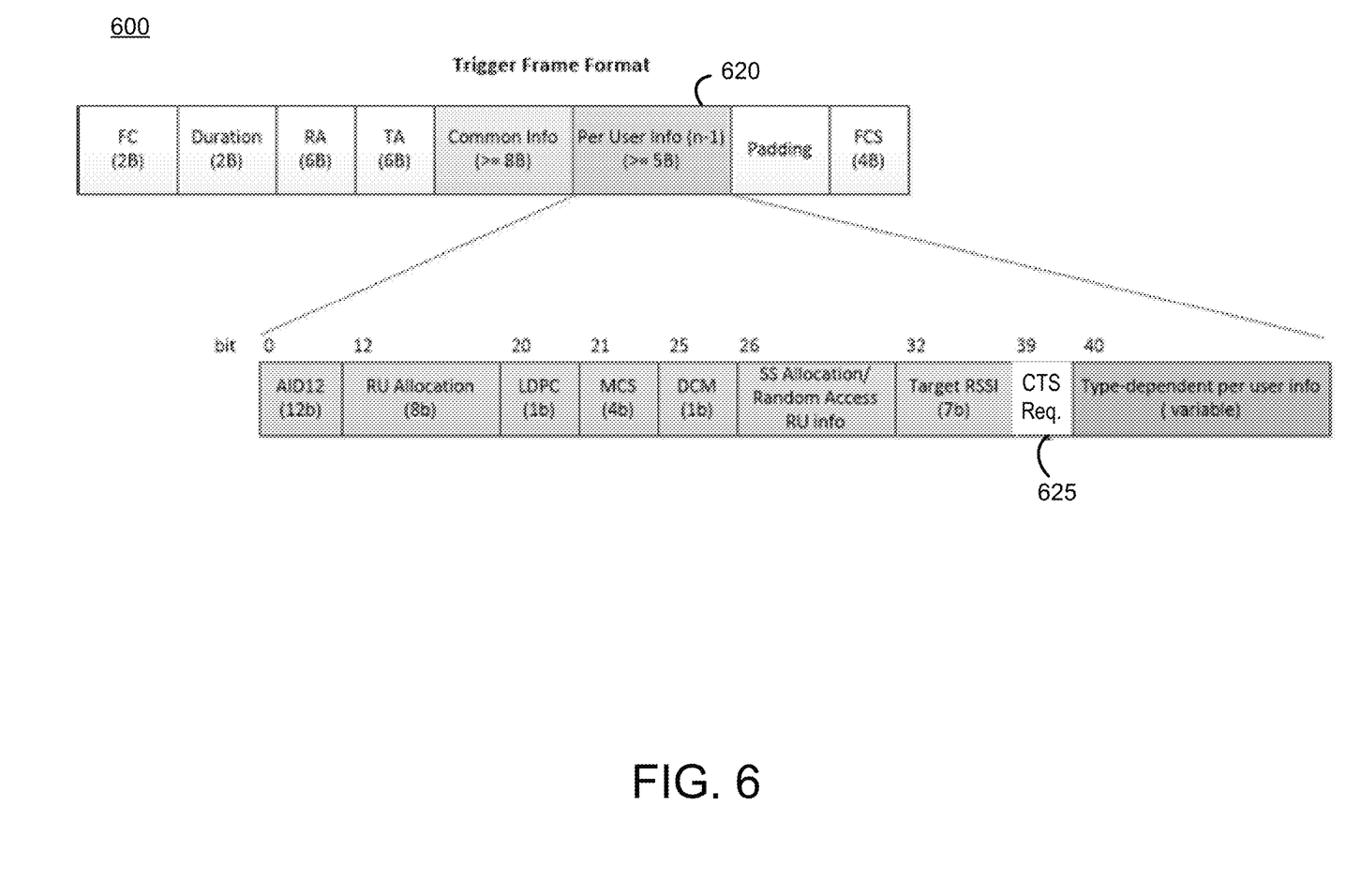
FIG. 6 is a diagram depicting an example trigger frame with a clear-to-send (CTS) request in a per user information section.

Referring to FIG. 6, illustrated is a diagram depicting an example trigger frame 600 with a clear-to-send (CTS) request 625 in a per user information section 620. The per user information section 620 is directed to a particular station device 120 or a particular group of station devices 120. In one approach, the per user information section 620 includes a CTS request 625. The CTS request 625 is a predetermined bit that causes a particular station device 120 or a particular group of station devices 120 associated with the per user information section 620 to transmit a first response message (e.g., HE_TB 420) and a second response message (e.g., CTS 430).

Although the trigger frames 500 and 600 are shown in FIGS. 5 and 6, the principles disclosed herein may be applied to other frames (e.g., MU-BAR, NDP feedback report pool (NRP), buffer status report poll (BQRP), bandwidth query report poll (BQRT), etc.).

Various embodiments disclosed herein are related to a method, a system, and a non-transitory computer readable medium storing instructions for extending a range of wireless communication. An AP may determine that a clear-to-send (CTS) response frame has not been received from at least one of a plurality of station devices during a first listening period after transmission of a CTS request frame. Responsive to the determination that the CTS response frame has not been received from the at least one of the plurality of station devices, the AP may transmit to the plurality of station devices a trigger frame comprising a predetermined bit set to indicate that the CTS response frame has not been received. The AP may receive from each of the plurality of station devices during a second listening period after the transmission of the trigger frame, an uplink data frame. The AP may receive from the at least one of the plurality of station devices during a third listening period after the transmission of the trigger frame subsequent to the second listening period, a retransmitted CTS response frame.

In one or more embodiments, the predetermined bit is transmitted in a common info section of the trigger frame, where receipt of the trigger frame causes each of the plurality of station devices to transmit the uplink data frame and to retransmit the retransmitted CTS response frame.

In one or more embodiments, the predetermined bit is transmitted in a per user info section of the trigger frame corresponding to a first station device for which the AP did not receive the CTS response frame. Receipt of the trigger frame may cause the first station device to transmit a first uplink data frame and to retransmit the retransmitted CTS response frame. Receipt of the trigger frame may also cause a second station device to transmit a second uplink data frame and wait for a predetermined period of time corresponding to the retransmission of the retransmitted CTS response frame by the first station device.

In one or more embodiments, the access point transmits the CTS request frame to the plurality of station devices, and receives from each of a subset of the plurality of station devices fewer in number than the plurality of station devices, the retransmitted CTS response frame.

In one or more embodiments, the AP determines that the retransmitted CTS response frame has been received from each of the plurality of station devices. Responsive to the determination that the retransmitted CTS response frame has been received from each of the plurality of station devices, the AP may transmit a downlink frame to the plurality of station devices.

B. Computing and Network Environment

Figure 7A:
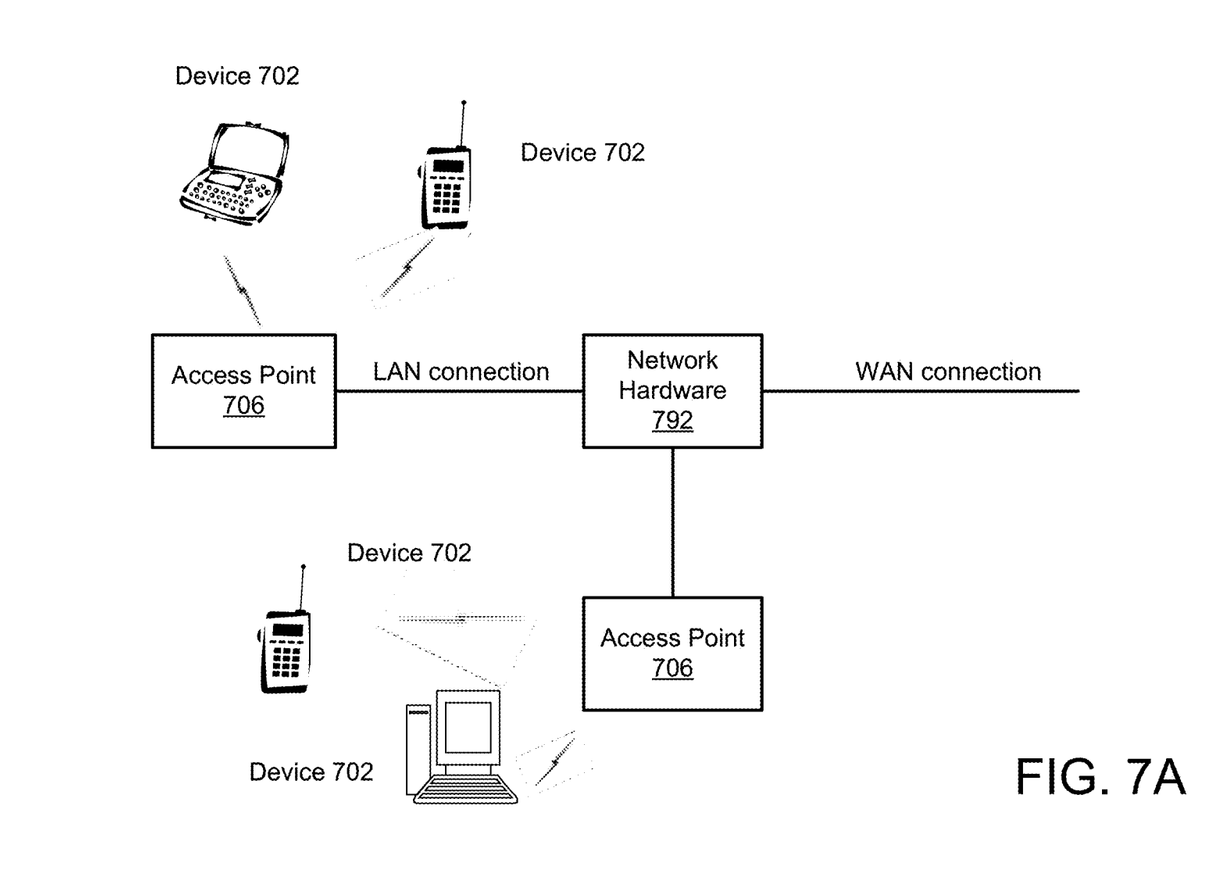
FIG. 7A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 7A, an embodiment of a network environment is depicted. In brief overview, the network environment includes a wireless communication system that includes one or more access points 706, one or more wireless communication devices 702 and a network hardware component 792. The wireless communication devices 702 may for example include laptop computers 702, tablets 702, personal computers 702 and/or cellular telephone devices 702. The details of an embodiment of each wireless communication device and/or access point are described in greater detail with reference to FIGS. 7B and 7C. The network environment can be an ad hoc network environment, an infrastructure wireless network environment, a subnet environment, etc. in one embodiment The APs 706 may be operably coupled to the network hardware 792 via local area network connections. The network hardware 792, which may include a router, gateway, switch, bridge, modem, system controller, appliance, etc., may provide a local area network connection for the communication system. Each of the access points 706 may have an associated antenna or an antenna array to communicate with the wireless communication devices 702 in its area. The wireless communication devices 702 may register with a particular access point 706 to receive services from the communication system (e.g., via a SU-MIMO or MU-MIMO configuration). For direct connections (e.g., point-to-point communications), some wireless communication devices 702 may communicate directly via an allocated channel and communications protocol. Some of the wireless communication devices 702 may be mobile or relatively static with respect to the access point 706.

In some embodiments an access point 706 includes a device or module (including a combination of hardware and software) that allows wireless communication devices 702 to connect to a wired network using Wi-Fi, or other standards. An access point 706 may sometimes be referred to as a wireless access point (WAP). An access point 706 may be configured, designed and/or built for operating in a wireless local area network (WLAN). An access point 706 may connect to a router (e.g., via a wired network) as a stand-alone device in some embodiments. In other embodiments, an access point can be a component of a router. An access point 706 can provide multiple devices 702 access to a network. An access point 706 may, for example, connect to a wired Ethernet connection and provide wireless connections using radio frequency links for other devices 702 to utilize that wired connection. An access point 706 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 706 may be used for (e.g., in-home or in-building) wireless networks (e.g., IEEE 802.11, Bluetooth, ZigBee, any other type of radio frequency based network protocol and/or variations thereof). Each of the wireless communication devices 702 may include a built-in radio and/or is coupled to a radio. Such wireless communication devices 702 and /or access points 706 may operate in accordance with the various aspects of the disclosure as presented herein to enhance performance, reduce costs and/or size, and/or enhance broadband applications. Each wireless communication devices 702 may have the capacity to function as a client node seeking access to resources (e.g., data, and connection to networked nodes such as servers) via one or more access points 706.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 7B:
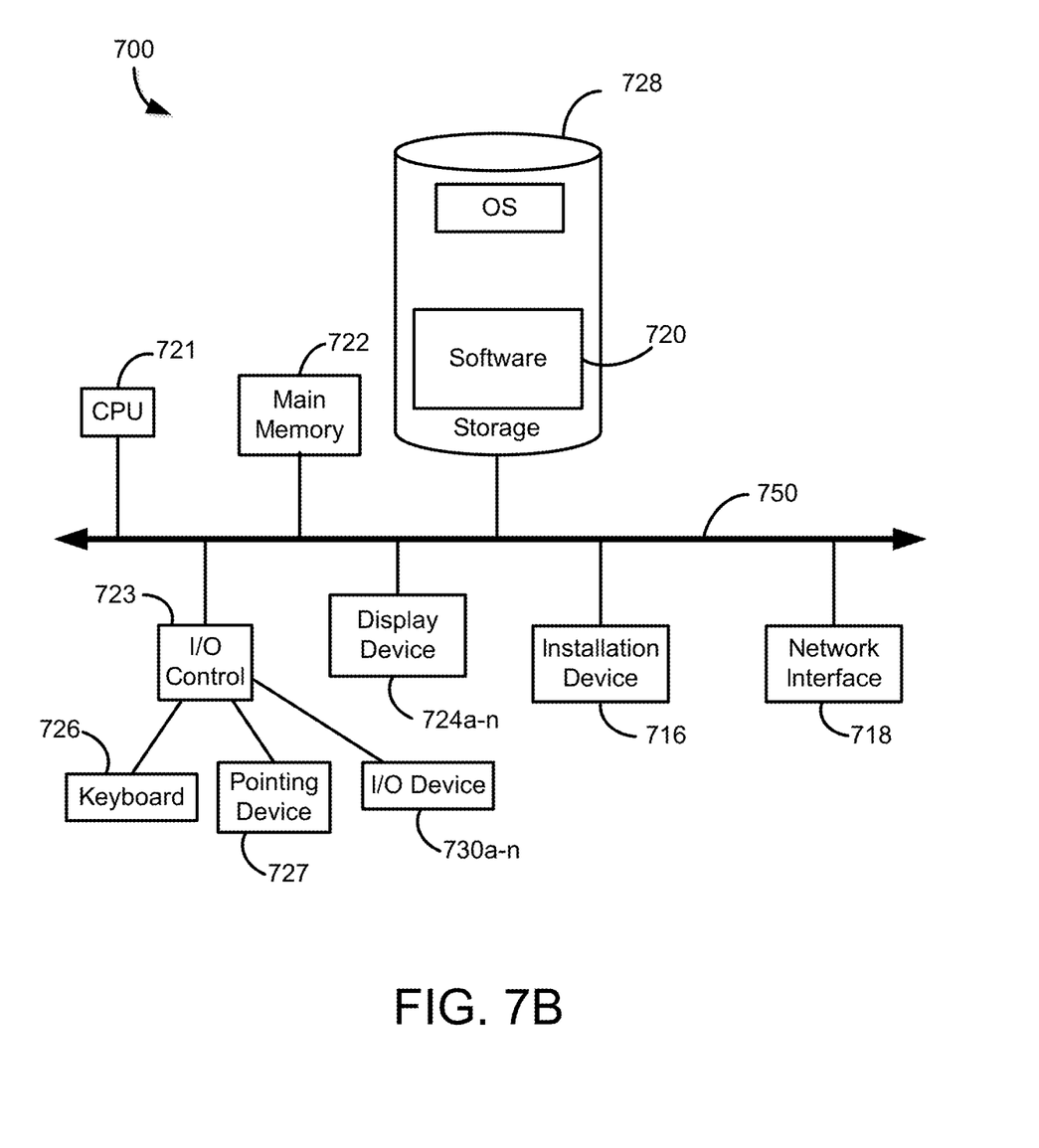
FIGS. 7B and 7C are block diagrams depicting embodiments of computing devices useful in connection with the methods and systems described herein.
Figure 7C:
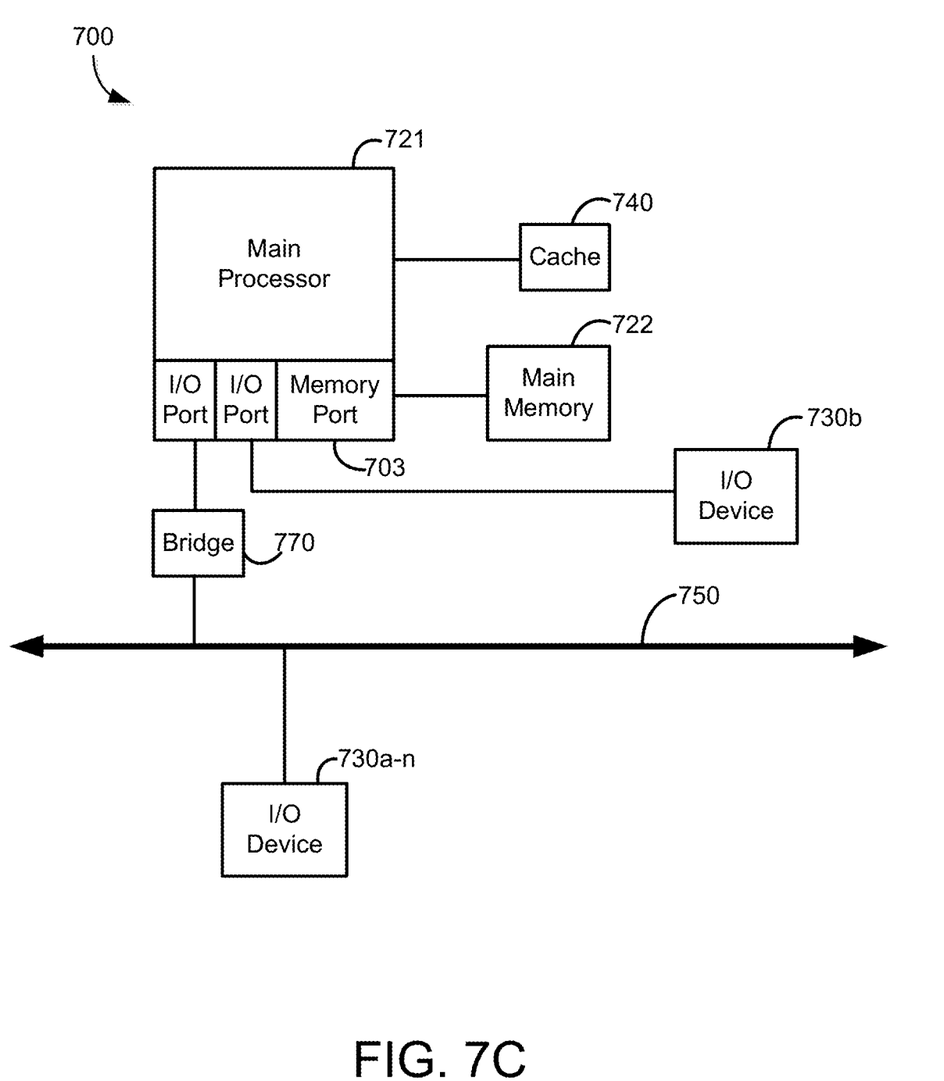

The communications device(s) 702 and access point(s) 706 may be deployed as and/or executed on any type and form of computing device, such as a computer, network device or appliance capable of communicating on any type and form of network and performing the operations described herein. FIGS. 7B and 7C depict block diagrams of a computing device 700 useful for practicing an embodiment of the wireless communication devices 702 or the access point 706. As shown in FIGS. 7B and 7C, each computing device 700 includes a central processing unit 721, and a main memory unit 722. As shown in FIG. 7B, a computing device 700 may include a storage device 728, an installation device 716, a network interface 718, an I/O controller 723, display devices 724a-724n, a keyboard 726 and a pointing device 727, such as a mouse. The storage device 728 may include, without limitation, an operating system and/or software. As shown in FIG. 7C, each computing device 700 may also include additional optional elements, such as a memory port 703, a bridge 770, one or more input/output devices 730a-730n (generally referred to using reference numeral 730), and a cache memory 740 in communication with the central processing unit 721.

The central processing unit 721 is any logic circuitry that responds to and processes instructions fetched from the main memory unit 722. In many embodiments, the central processing unit 721 is provided by a microprocessor unit, such as: those manufactured by Intel Corporation of Santa Clara, Calif.; those manufactured by International Business Machines of White Plains, N.Y.; or those manufactured by Advanced Micro Devices of Sunnyvale, Calif. The computing device 700 may be based on any of these processors, or any other processor capable of operating as described herein.

Main memory unit 722 may be one or more memory chips capable of storing data and allowing any storage location to be directly accessed by the microprocessor 721, such as any type or variant of Static random access memory (SRAM), Dynamic random access memory (DRAM), Ferroelectric RAM (FRAM), NAND Flash, NOR Flash and Solid State Drives (SSD). The main memory 722 may be based on any of the above described memory chips, or any other available memory chips capable of operating as described herein. In the embodiment shown in FIG. 7B, the processor 721 communicates with main memory 722 via a system bus 750 (described in more detail below). FIG. 7C depicts an embodiment of a computing device 700 in which the processor communicates directly with main memory 722 via a memory port 703. For example, in FIG. 7C the main memory 722 may be DRDRAM.

FIG. 7C depicts an embodiment in which the main processor 721 communicates directly with cache memory 740 via a secondary bus, sometimes referred to as a backside bus. In other embodiments, the main processor 721 communicates with cache memory 740 using the system bus 750. Cache memory 740 typically has a faster response time than main memory 722 and is provided by, for example, SRAM, BSRAM, or EDRAM. In the embodiment shown in FIG. 7C, the processor 721 communicates with various I/O devices 730 via a local system bus 750. Various buses may be used to connect the central processing unit 721 to any of the I/O devices 730, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 724, the processor 721 may use an Advanced Graphics Port (AGP) to communicate with the display 724. FIG. 7C depicts an embodiment of a computer 700 in which the main processor 721 may communicate directly with I/O device 730b, for example via HYPERTRANSPORT, RAPIDIO, or INFINIBAND communications technology. FIG. 7C also depicts an embodiment in which local busses and direct communication are mixed: the processor 721 communicates with I/O device 730a using a local interconnect bus while communicating with I/O device 730b directly.

A wide variety of I/O devices 730a-730n may be present in the computing device 700. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 723 as shown in FIG. 7B. The I/O controller may control one or more I/O devices such as a keyboard 726 and a pointing device 727, e.g., a mouse or optical pen. Furthermore, an I/O device may also provide storage and/or an installation medium 716 for the computing device 700. In still other embodiments, the computing device 700 may provide USB connections (not shown) to receive handheld USB storage devices such as the USB Flash Drive line of devices manufactured by Twintech Industry, Inc. of Los Alamitos, Calif.

Referring again to FIG. 7B, the computing device 700 may support any suitable installation device 716, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 700 may further include a storage device, such as one or more hard disk drives or redundant arrays of independent disks, for storing an operating system and other related software, and for storing application software programs such as any program or software 720 for implementing (e.g., configured and/or designed for) the systems and methods described herein. Optionally, any of the installation devices 716 could also be used as the storage device. Additionally, the operating system and the software can be run from a bootable medium.

Furthermore, the computing device 700 may include a network interface 718 to interface to the network 704 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 700 communicates with other computing devices 700' via any type and/or form of gateway or tunneling protocol such as Secure Socket Layer (SSL) or Transport Layer Security (TLS). The network interface 718 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

In some embodiments, the computing device 700 may include or be connected to one or more display devices 724a-724n. As such, any of the I/O devices 730a-730n and/or the I/O controller 723 may include any type and/or form of suitable hardware, software, or combination of hardware and software to support, enable or provide for the connection and use of the display device(s) 724a-724n by the computing device 700. For example, the computing device 700 may include any type and/or form of video adapter, video card, driver, and/or library to interface, communicate, connect or otherwise use the display device(s) 724a-724n. In one embodiment, a video adapter may include multiple connectors to interface to the display device(s) 724a-724n. In other embodiments, the computing device 700 may include multiple video adapters, with each video adapter connected to the display device(s) 724a-724n. In some embodiments, any portion of the operating system of the computing device 700 may be configured for using multiple displays 724a-724n. One ordinarily skilled in the art will recognize and appreciate the various ways and embodiments that a computing device 700 may be configured to have one or more display devices 724a-724n.

In further embodiments, an I/O device 730 may be a bridge between the system bus 750 and an external communication bus, such as a USB bus, an Apple Desktop Bus, an RS-232 serial connection, a SCSI bus, a FireWire bus, a FireWire 700 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 700 of the sort depicted in FIGS. 7B and 7C may operate under the control of an operating system, which control scheduling of tasks and access to system resources. The computing device 700 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 700 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 700 has sufficient processor power and memory capacity to perform the operations described herein.

In some embodiments, the computing device 700 may have different processors, operating systems, and input devices consistent with the device. For example, in one embodiment, the computing device 700 is a smart phone, mobile device, tablet or personal digital assistant. In still other embodiments, the computing device 700 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method, comprising:
    receiving, by a first station device, a trigger frame comprising a predetermined bit from an access point;
    transmitting, by the first station device to the access point, a first response message in a first format during a first time period, in response to detecting the predetermined bit in the trigger frame;
    transmitting, by the first station device to the access point, a second response message in a second format during a second time period after the first time period, in response to detecting the predetermined bit in the trigger frame; and
    receiving, by the first station device from the access point, a downlink frame during a third time period after the first time period and the second time period, wherein the second time period is between the first time period and the third time period.

2. The method of claim 1, wherein the first station device is configured to transmit, during the first time period, the first response message in a first wireless signal having a narrower bandwidth than a second wireless signal including the second response message transmitted during the second time period.

3. The method of claim 1, wherein the first station device is configured to transmit, during the first time period, the first response message in a first wireless signal having a higher power than a second wireless signal including the second response message transmitted during the second time period.

4. The method of claim 1, wherein the predetermined bit causes a second station device to transmit a third response message to the access point during the first time period and a fourth response message during the second time period.

5. The method of claim 1, wherein the predetermined bit causes a second station device to not transmit any signal during the first time period and the second time period.

6. The method of claim 1, wherein the second response message prevents the first station device and a second station device from transmitting any signal during the third time period.

7. A method, comprising:
    transmitting, by an access point to a plurality of station devices, a trigger frame comprising a predetermined bit set to cause a first station device of the plurality of station devices to transmit a first response message in a first format and a second response message in a second format, each of the first response message and the second response message indicating that the access point is clear to transmit;

enabling a receiver of the access point during a first time period to receive the first response message from the first station device in the first format during the first time period, in response to the predetermined bit in the trigger frame;

enabling the receiver of the access point during a second time period after the first time period to receive the second response message from the first station device in the second format during the second time period, in response to the predetermined bit in the trigger frame; and transmitting, by the access point to the first station device, a downlink frame during a third time period after the first time period and the second time period, in response to receiving at least one of the first response message and the second response message, wherein the second time period is between the first time period and the third time period.

8. The method of claim 7, wherein the predetermined bit causes the first station device to transmit, during the first time period, the first response message in a first wireless signal having a narrower bandwidth than a second wireless signal including the second response message transmitted during the second time period.

9. The method of claim 7, wherein the predetermined bit causes the first station device to transmit, during the first time period, the first response message in a first wireless signal having a higher power than a second wireless signal including the second response message transmitted during the second time period.

10. The method of claim 7, wherein the predetermined bit causes a second station device of the plurality of station devices to transmit a third response message to the access point during the first time period and a fourth response message during the second time period.

11. The method of claim 7, wherein the predetermined bit causes a second station device of the plurality of station devices to not transmit any signal during the first time period and the second time period.

12. The method of claim 7, wherein the second response message prevents the plurality of station devices from transmitting any signal during the third time period.

13. A device, comprising:
a receiver;
a transmitter; and
a transmission management circuit coupled to the receiver and the transmitter, the transmission management circuit configured to:
generate a trigger frame comprising a predetermined bit, the predetermined bit set to cause a first station device to transmit a first response message in a first format and a second response message in a second format, each of the first response message and the second response message indicating that the device is clear to transmit;

configure the transmitter to transmit a first transmit wireless signal including the trigger frame to the first station device;

enable the receiver during a first time period to receive a first receive wireless signal including the first response message in the first format from the first station device during the first time period, in response to the predetermined bit in the trigger frame;

enable the receiver during a second time period after the first time period to receive a second receive wireless signal including the second response message in the second format from the first station device during the second time period, in response to the predetermined bit in the trigger frame; and configure the transmitter to transmit, to one or more station devices including at least the first station device, a second transmit wireless signal including a downlink frame during a third time period after the first time period and the second time period, in response to receiving one of the first response message and the second response message, wherein the second time period is between the first time period and the third time period.

14. The device of claim 13, wherein the predetermined bit causes the first station device to transmit the first response message in the first receive wireless signal having a narrower bandwidth than the second receive wireless signal including the second response message.

15. The device of claim 13, wherein the predetermined bit causes the first station device to transmit the first response message in the first receive wireless signal having a higher power than the second receive wireless signal including the second response message.

16. The device of claim 13, wherein the predetermined bit causes a second station device to transmit a third response message to the device during the first time period and a fourth response message during the second time period.

17. The device of claim 13, wherein the predetermined bit causes a second station device to not transmit any signal during the first time period and the second time period.

18. The device of claim 13, wherein the second response message prevents the first station device and a second station device from transmitting any signal during the third time period.

19. The device of claim 13, wherein the predetermined bit is set to cause a second station device to transmit the first response message in the first format and the second response message in the second format.

20. The device of claim 19, wherein the predetermined bit is in a common information section accessible to the first station device and the second station device.

* * * * *